United States Patent
Spyropoulos et al.

(10) Patent No.: US 10,826,616 B2
(45) Date of Patent: Nov. 3, 2020

(54) RECONFIGURABLE DIGITAL PREDISTORTION CIRCUIT

(71) Applicant: Maxlinear, Inc., Carlsbad, CA (US)

(72) Inventors: Ioannis Spyropoulos, La Jolla, CA (US); Anand Anandakumar, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/376,504

(22) Filed: Apr. 5, 2019

(65) Prior Publication Data

US 2019/0312649 A1    Oct. 10, 2019

Related U.S. Application Data

(60) Provisional application No. 62/653,834, filed on Apr. 6, 2018.

(51) Int. Cl.
| | | |
|---|---|---|
| *H04B 10/564* | (2013.01) | |
| *H04B 1/04* | (2006.01) | |
| *H04B 10/58* | (2013.01) | |

(52) U.S. Cl.
CPC ......... *H04B 10/564* (2013.01); *H04B 1/0475* (2013.01); *H04B 10/58* (2013.01); *H04B 2001/0425* (2013.01)

(58) Field of Classification Search
CPC .... H04B 10/564; H04B 1/0475; H04B 10/58; H04B 2001/0425
See application file for complete search history.

(56) References Cited

U.S. PATENT DOCUMENTS

| | | | | |
|---|---|---|---|---|
| 5,867,486 A | * | 2/1999 | Sugiyama | ................ H04B 3/23 370/290 |
| 6,151,614 A | * | 11/2000 | Ikeda | ....................... H04B 3/23 708/322 |
| 6,351,457 B1 | * | 2/2002 | Sugiyama | ................ H04B 3/23 370/290 |
| 6,442,274 B1 | * | 8/2002 | Sugiyama | ................ H04B 3/23 379/406.01 |
| 2001/0004384 A1 | * | 6/2001 | Takanashi | ........... H04L 25/0202 375/229 |

(Continued)

OTHER PUBLICATIONS

Non-provisional U.S. Appl. No. 16/379,759, filed Apr. 9, 2019.

*Primary Examiner* — Mina M Shalaby
(74) *Attorney, Agent, or Firm* — Maschoff Brennan (57) ABSTRACT

A system comprises a digital predistortion circuit comprising: a first quantity of delay circuits configured to delay a signal to be predistorted; a second quantity of filter tap circuits, wherein the second quantity is smaller than the first quantity; and a delay-to-filter-taps mapping circuit that is operable to map each output of a first subset of the delay circuits to a corresponding input of the filter tap circuits. The system may comprise circuitry operable to select which of the first quantity of delay circuits is in the first subset. The selection of which of the first quantity of delay circuits is in the first subset may be based on a temperature measurement. The digital predistortion circuit may comprise cross-term generation circuitry operable to generate cross-term signals corresponding to the cross products of multiple, differently-delayed versions of a signal input to the digital predistortion circuit.

17 Claims, 5 Drawing Sheets

(56) References Cited

U.S. PATENT DOCUMENTS

| | | | |
|---|---|---|---|
| 2002/0023115 A1* | 2/2002 | Kanasugi | H03H 17/0219 |
| | | | 708/313 |
| 2004/0143615 A1* | 7/2004 | Yomo | H03H 17/0223 |
| | | | 708/300 |
| 2014/0348276 A1* | 11/2014 | Pandey | H04B 1/1027 |
| | | | 375/350 |
| 2017/0330593 A1* | 11/2017 | Higashino | G11B 20/10009 |

* cited by examiner

RECONFIGURABLE DIGITAL PREDISTORTION CIRCUIT

PRIORITY CLAIM

This application claims the benefit of U.S. provisional application 62/653,834 filed on Apr. 6, 2018, which is hereby incorporated herein by reference in its entirety.

BACKGROUND

Limitations and disadvantages of conventional approaches to digital predistortion will become apparent to one of skill in the art, through comparison of such systems with some aspects of the present invention as set forth in the remainder of the present application with reference to the drawings.

BRIEF SUMMARY

Systems and methods for a reconfigurable digital predistortion circuit, substantially as shown in and/or described in connection with at least one of the figures, as set forth more completely in the claims.

Advantages, aspects, and novel features of the present disclosure, as well as details of various implementations thereof, will be more fully understood from the following description and drawings.

DETAILED DESCRIPTION OF THE INVENTION

Figure 1:
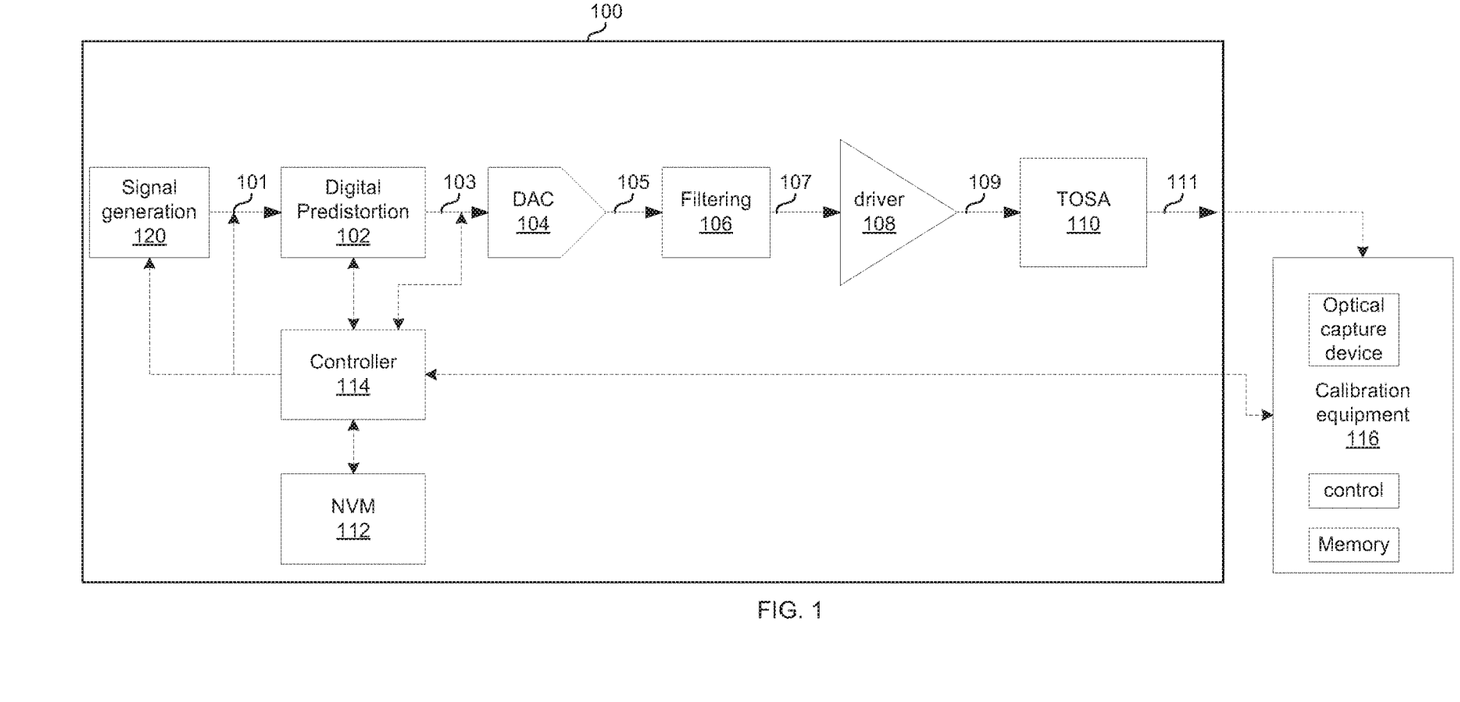
FIG. 1 shows example circuitry of an opto-electronic transmitter comprising a configurable digital predistortion circuit.

FIG. 1 shows example circuitry of an opto-electronic transmitter 100 comprising a configurable digital predistortion circuit. Shown are signal generation circuit 120, configurable digital predistortion circuit 102, digital to analog converter (DAC) circuit 104, filtering circuit 106, driver circuit 108, transmit optical subassembly (TOSA) 110, nonvolatile memory 112, and controller 114. Other circuitry of the transmitter 100 is not shown for clarity of illustration. Also shown is calibration equipment 116.

The digital predistortion circuit 102 is operable to predistort the signal 101 to compensate for nonlinearity and memory effects introduced by subsequent circuits (e.g., by the DAC 104, filter 106, diver 108, and/or the TOSA 110, which are, generally, nonlinear and/or bandwidth-limiting circuits). In a typical implementation, the nonlinearity and bandwidth limitation may be dominated by the driver 108 and the TOSA 110. The nonlinearity and memory effects degrade the signal integrity of the transmitted signal, which must be kept within strict limits, typically, specified by industry standards (e.g. the IEEE 802.3bs and 802.3cd standards) to ensure interoperability of one manufacturer's transmitter with other manufacturers' receivers. The digital predistortion circuit 102 is designed and calibrated for improving the transmitted signal integrity within the spec limits with certain operating margin. That is, the overall response from signal 101 to signal 111 is more linear and frequency 'flat' (i.e. less frequency selective) with the predistortion circuit 102 than without the digital predistortion circuit 102 (i.e., more linear and frequency 'flat' than if signal 101 was input directly to the DAC 104). As described in more detail below with reference to FIG. 2, the digital predistortion circuit 102 is configurable to compensate for variations among different transmitters. Such variations may include, for example, differences in the circuit(s) 104, 106, 108 and/or 110 and/or their layout among different makes and models of transmitters 100. Additionally, or alternatively, such variations may include, for example, process, temperature, and/or voltage variations which may, for example, result in different amounts of mismatch between RF circuits (and resulting reflections) in different instances of the same make and model of transmitter.

The digital to analog converter circuit (DAC) 104 is operable to convert the digital signal 103 to an analog representation. The DAC 104 may be any suitable type of DAC (e.g., resistive ladder, current scaling, etc.).

The filtering circuit 106 is operable to perform anti-aliasing and/or other filtering of the signal 105 to remove undesired components of the signal 105 (e.g., aliases introduced by DAC 104) generating the signal 107.

The driver 108 is operable to condition the signal 107 (e.g., amplify its voltage, amplify its current, convert its current to a voltage, and/or convert its voltage to a current) to generate the signal 109.

The TOSA 110 is operable to receive electrical signal 109 and convert it to an optical signal 111 for output onto a fiber. The transmit optical subassembly 110 may comprise, for example, a laser diode and an electro-optic modulator (e.g. electro-absorption externally modulated laser, or Mach-Zehnder modulator, or directly modulated laser).

The controller 114 comprises circuitry operable to configure and control operations of the transmitter 100. The controller may read parameters/settings from NVM 112 and write those parameters to one or more of circuit(s) 120, 102, 104, 106, 108, and/or 110. Similarly, the controller 114 may monitor and/or take measurements of one or more of the circuit(s) 102, 104, 106, 108, and/or 110 and/or signals 101, 103, 105, 107, 109, and 111 and may store the results of the monitoring and/or measurement to NVM 112. The controller 114 may also comprise other sensors such as a temperature sensor for monitoring the temperature of the transmitter 100. The digital predistortion circuit 102 may be configured dynamically during operation of the transmitter 100 after it is deployed in the field (such as in a hybrid fiber-coaxial network of a cable provider or in high-speed Ethernet optical links inside data centers or interconnecting data centers) based on temperature and/or other parameters such as measured voltage levels, as further described below in this disclosure.

The nonvolatile memory 112 comprises any suitable type of nonvolatile memory such as FLASH, EEPROM and/or the like.

Figure 2:
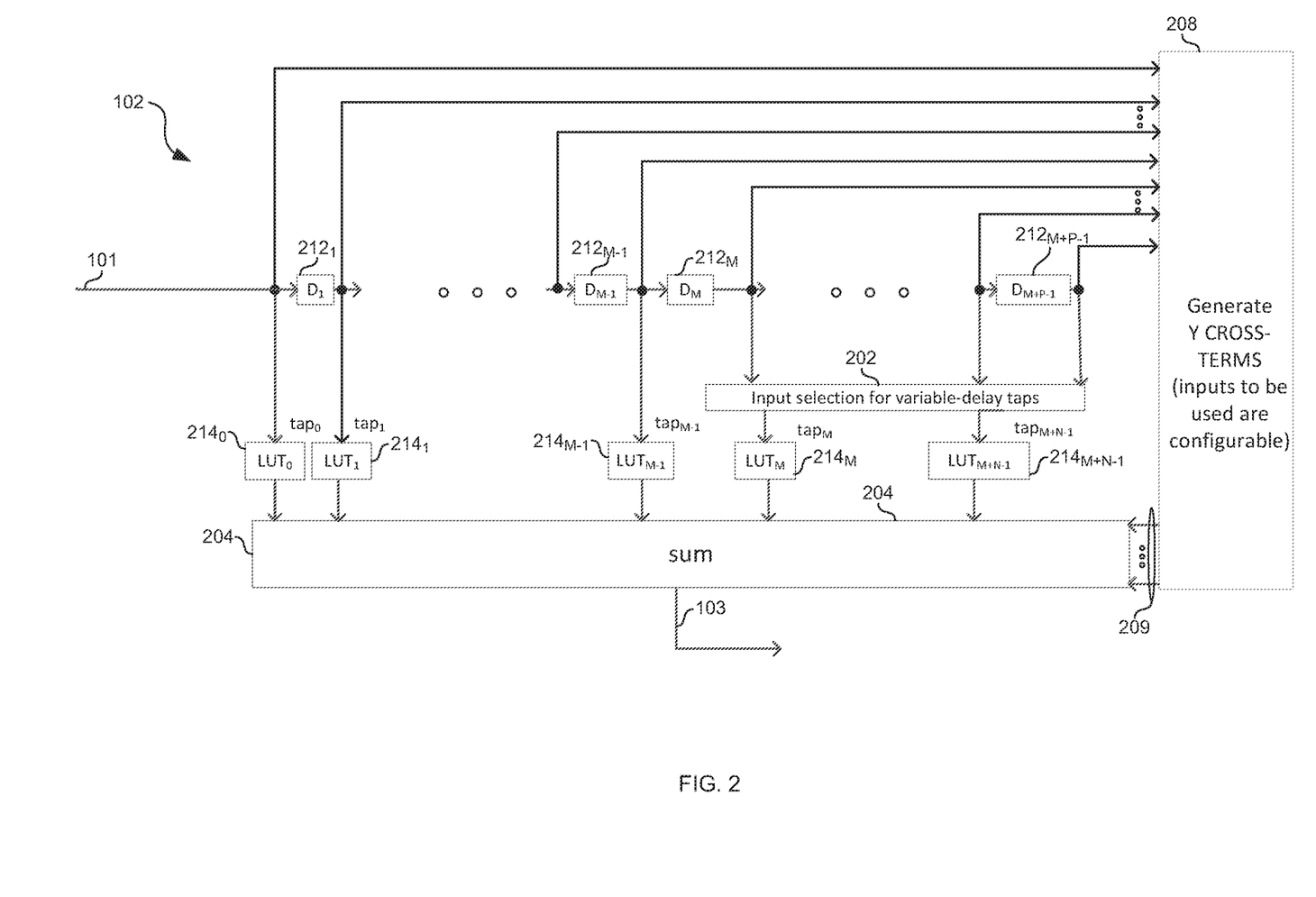
FIG. 2 shows an example implementation of the configurable digital predistortion circuit of FIG. 1.

The calibration equipment 116 comprises circuitry operable to communicate with controller 114 to monitor and control operation of the transmitter 100 during a test calibration routine (e.g., to program the lookup tables LUTs $214_0$-$214_{M+N-1}$ and the cross-terms generator 208). The calibration equipment comprises control circuitry (e.g., a microprocessor and memory) and an optical capture device (e.g., operable to capture and digitize the optical waveform 111).

In an example implementation, the calibration equipment provides a test signal comprising encoded symbols which the controller 114 then feeds into the digital predistortion circuit 102 as signal 101 or into the DAC circuit 104 as signal 103. For example, the calibration equipment 116 may store a waveform to memory 112 and/or memory of the controller 114, and then that waveform may be streamed out as signal 101 or signal 103 during calibration. In another implementation, the transmitter 100 may comprise its own signal generation circuitry 120 (e.g., may comprise a playback memory from which samples of a waveform can be streamed and/or may comprise a pseudorandom pattern generator which may generate signal) and the signal 101 may be generated by the circuitry 120 rather than by the calibration equipment 116.

In an example implementation, the calibration equipment 116 is operable to emulate the digital predistortion circuit 102 in order to determine suitable delays for the predistortion taps and the corresponding weights (e.g., implemented as lookup tables) as described below.

FIG. 2 shows an example implementation of the configurable digital predistortion circuit of FIG. 1. The example predistortion circuit 102 comprises a plurality of delay circuits $212_1$-$212_{M+P-1}$, a plurality of lookup table (LUT) circuits $214_0$-$214_{M+N-1}$, a variable-delay taps selection circuit 202, a cross-terms generation circuit 208, and a summing circuit 204. Each of M, N, and P are integers, and N is smaller than P.

Each of plurality of delay circuits $212_1$-$212_{M+P-1}$ may comprise, for example, a register. Delay elements $212_1$ to $212_{M-1}$ (where M is an integer) have their outputs coupled to a respective one of LUTs $214_1$-$214_{M-1}$. Delay elements $212_M$ to $212_{M+P-1}$ have their outputs coupled to selection circuit 202.

Each lookup table (LUT) circuit $214_z$ (where z is an integer and 0≤z≤M+N−1) comprises a lookup table populated with values according to a predetermined polynomial to be realized by the z-th tap. For example, the input signal may be a PAM-K (where K is an integer in general and is typically a power of 2–4, 8, 16, etc.) signal and each lookup table circuit 214 may store the K outputs of the polynomial corresponding to the K possible input values. Filter taps $214_0$-$214_{M-1}$ are referred to herein as "fixed-delay" taps since which of delay elements $212_1$-$212_{M-1}$ is coupled to each of LUTs $214_0$-$214_{M-1}$ is fixed. Filter taps $214_M$-$214_{M+N-1}$ are referred to herein as "variable-delay" taps since which of delay elements $212_M$-$212_{M+P-1}$ is coupled to each of LUTs $214_M$-$214_{M+N-1}$ is variable.

The variable-delay taps selection circuit 202 is configurable to select which of the delay elements $212_M$ to $212_{M+P-1}$ are coupled to respective ones of the LUTs $214_M$ to $214_{M+N-1}$. This ability to dynamically configure the delay for taps $214_M$ to $214_{M+N-1}$ enables compensating for variations between different implementations of transmitter 100. For example, different ones of the delays $212_M$ to $212_{M+P-1}$ may be selected for different makes and/or models of the circuits 104, 106, 108, and/or 110, for different layouts of the circuits 104, 106, 108, and/or 110 (e.g., different trace lengths and/or impedances between the driver 108 and TOSA 110 leading to different reflection characteristics), and/or for variations in process, temperature, and/or voltage.

The cross-terms generation circuit 208 is operable to generate Y (an integer) cross-term signals 209 that compensate for nonlinearities not compensated for by the finite number, M+N, of taps. The cross-terms generation circuit 208 may, for example, enable compensating for nonlinear terms (i.e., cross products) that arise with cascaded and bandwidth-limited nonlinear circuits. These terms may be the result of multiplication of multiple differently-delayed (and, optionally, weighted by coefficients) versions of the input signal.

The summing circuit 204 is operable to sum: the outputs of taps $214_0$ to $214_{M+N-1}$ and the cross-terms 209. The result of the summation is the signal 103.

Figure 3A:
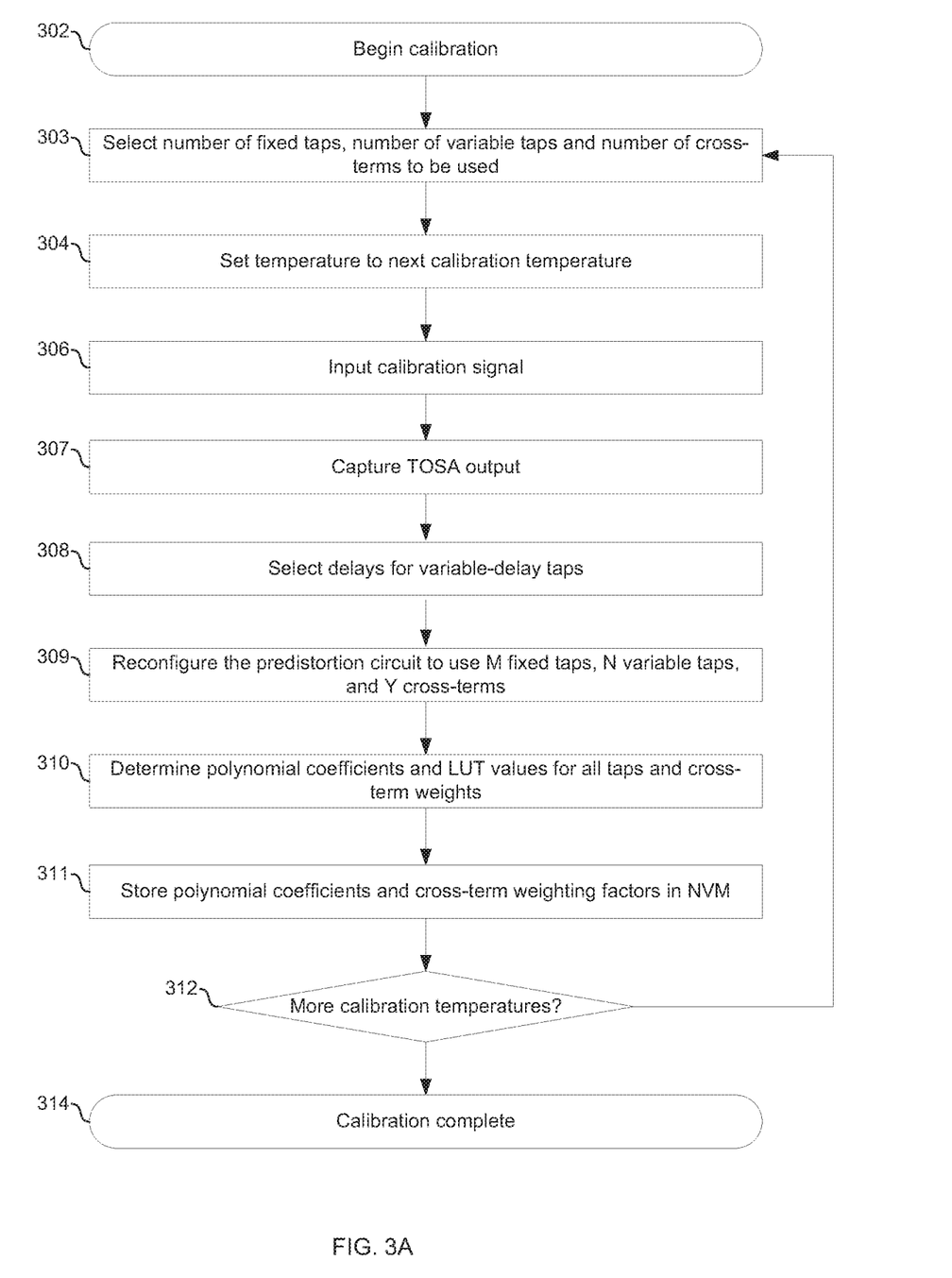
FIG. 3A is a flowchart illustrating an example process for configuring the digital predistortion circuit of FIG. 2.

FIG. 3A is a flowchart illustrating an example process for configuring the digital predistortion circuit of FIG. 2. The process begins with block 302 in which calibration begins (e.g., upon the transmitter 100 being placed in a test/calibration station in the factory).

In block 303, the calibration station selects the quantity of fixed-delay taps to use for processing a "live" (i.e., a non-calibration signal in the HFC network/datacenter/etc. in which the transmitter has been deployed) signal 101 (i.e., selects the value of M), how many variable-delay taps to use for processing a live signal 101 (i.e., selects the value of N), and how many and which cross terms to generate for processing of a live signal (i.e., selects the value of Y). In this regard, there may be more than M+N physical LUT circuits 214 available in the transmitter of which M are selected to be fixed-delay taps, N are selected to be variable-delay taps, and the remainder may be placed into a low-power mode. The value of M, N and Y may be set based on a desired trade off between signal quality and power consumption. The initial selection of M, N and Y may be based on prior characterizations of transmit signal integrity vs processing power for transmitters of particular characteristics (e.g., make, model, process, etc.)

In block 304, the ambient temperature in which the transmitter 100 is operating is brought to the next one of a plurality of predetermined calibration temperatures.

In block 306, the predistortion circuit 102 is set in an initial configuration and a calibration signal 101 is input to it. The calibration signal may be, for example, an encoded pseudorandom binary sequence, a predefined symbol sequence, an engineered waveform according to a predetermined modulation scheme (e.g., PAM-4) or standard (e.g., IEEE 802.3bs or 802.3cd), or any other suitable calibration signal. The initial configuration may, for example, use a predetermined M of the fixed taps, a predetermined N of the variable taps, and predetermined weighting factors for the cross-terms calculation. As another example, the default configuration may be to configure the predistortion circuit 102 as a pass through filter (or bypass it altogether) to get an initial characterization of the TOSA output.

In block 307, the output of the TOSA is captured by the calibration system.

In block 308, it is determined which of the delay elements $212_M$ to $212_{M+P-1}$ to couple to a respective one of LUTs $214_M$ to $214_{M+N-1}$. In an example implementation, this is done as described in FIG. 3B.

In block 309, the predistortion circuit is reconfigured to use the M fixed taps, the N variable taps determined in block 308, and corresponding Y cross terms.

In block 310, the calibration system determines: the polynomials to be implemented by the taps; the corresponding values to be stored in the LUTs $214_M$ to $214_{M+N-1}$; and the weighting factors for the cross-terms. In an example implementation, this is done by comparing the reference waveform 101 to the waveform 111 output by TOSA 110, and iteratively adjusting the polynomial coefficients and the cross-term weights until a best, or at least sufficient, match between the reference signal and the output signal 111 is achieved (e.g., using a least mean squares algorithm).

In block 311, the determined polynomial coefficients and/or corresponding LUT values and/or cross-term weights determined in block 310 for the current calibration temperature are stored in the NVM 112. In an alternative implementation, the polynomial coefficients and cross-term coefficients are determined as follows: the calibration system emulates the predistortion circuit 102 for M fixed taps, the determined N variable taps and Y cross-terms, with signal 111 being the emulator input. The polynomial coefficients and cross-term weights are iteratively adjusted until the emulator output closely 'matches' a reference waveform (e.g. the input to the DAC signal 103). The estimated polynomials and/or corresponding LUT entries and/or the cross-term weights are then stored to NVM 112 to be applied on the actual predistortion circuit 102 for processing live signals.

In block 312, if there are more temperatures at which calibration is to be performed, then the process returns to block 303. Otherwise, the process advances to block 314 and calibration is complete.

Figure 3B:
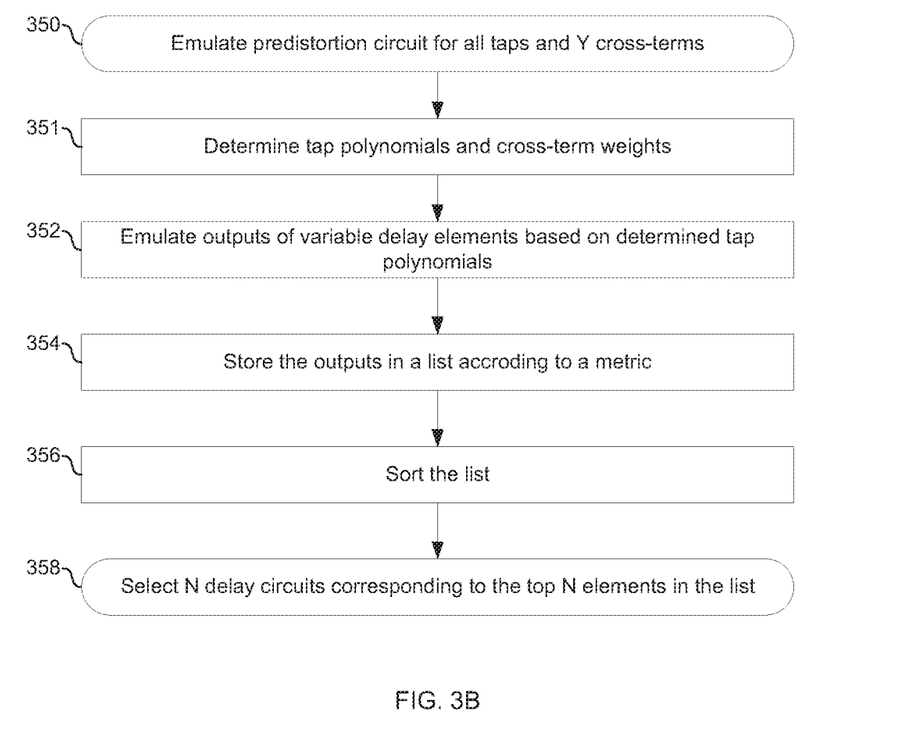
FIG. 3B is a flowchart illustrating an example process selecting delays for taps of the digital predistortion circuit of FIG. 2.

FIG. 3B is a flowchart illustrating an example process for selecting delays for taps of the digital predistortion circuit of FIG. 2. The process begins with block 350 in which the calibration equipment or the controller 222 emulates the predistortion circuit 102 assuming all delay circuits $212_M$ to $212_{M+P}$ and cross-terms Y are used. In block 351, the polynomial coefficients for all the taps and the cross-term weights are estimated. For example, in one implementation, this can be achieved by iteratively adjusting the polynomial coefficients and cross-term tap weights so that the emulator output for input signal 111 'closely' matches a reference waveform such as the DAC input signal 103 (e.g. using a least mean squares algorithm). In block 352, the outputs of the variable delay elements for the estimated polynomials corresponding to an input signal, such as the calibration input signal 101 or the TOSA output signal 111, are emulated.

In block 354, the emulated outputs for all variable delay taps are stored in a list or other data structure in memory of the controller 114 and/or calibration equipment 116. The outputs may be stored, for example, as lookup table values corresponding to the input signal 101 (e.g. PAM-K signal) or as waveforms corresponding to the signal 111 captured at the TOSA output.

In block 356, the list (or other data structure) of emulated outputs is sorted according to a determined metric (e.g., some function of the magnitude of the LUT values or some function of the error between the output waveform and a reference waveform, such as the input signal to DAC 103).

In block 358, the delay circuits $212_M$ to $212_{M+P}$ corresponding to the first N values in the sorted list are selected as the N delay elements to be coupled to LUTs $214_M$ to $214_{M+N}$ via circuit 202. An indication of which of selected delay circuits $212_M$ to $212_{M+P}$ were selected for the current temperature may be written to the nonvolatile memory 112.

In an example implementation, the sorted list may additionally or alternatively be used for characterizing a quality of the transmitter. For example, if a long delay ranks highly in the shorted list (i.e. it has a 'high' metric), that might be an indication of a strong reflection present in the transmitter due to an unacceptably high return loss on a long trace, for example, due to process variation. The calibration system may then flag the unit under test for additional quality inspection before it is permitted to be deployed into the field.

Figure 4:
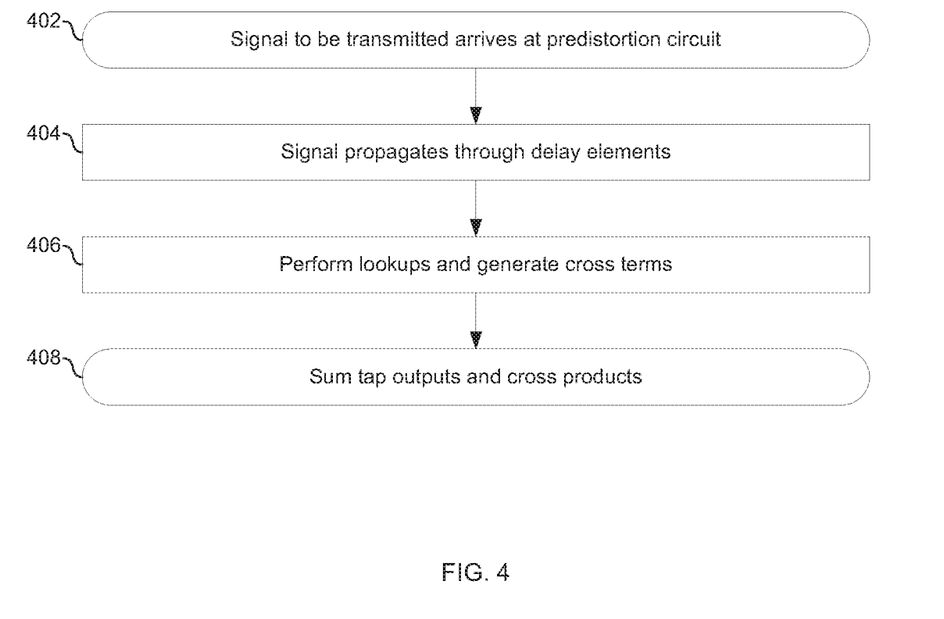
FIG. 4 is a flowchart illustrating an example process for performing digital predistortion via the digital predistortion circuit of FIG. 2.

FIG. 4 is a flowchart illustrating an example process for performing digital predistortion via the digital predistortion circuit of FIG. 2. The process begins in block 402 when a signal 101 to be transmitted arrives at the digital predistortion circuit 102.

In block 404, the signal propagates through the delay elements $212_1$-$212_{M+P-1}$.

In block 406, the LUTs $214_0$ to $214_{M+N-1}$ perform their lookups based on the temperature and on characteristics of the signal to be transmitted. Also, in block 406, the cross-term generation circuitry 208 generates the cross terms 209.

In block 408, the outputs of the LUTs $214_0$ to $214_{M+N-1}$ and the cross terms 209 are summed to generate predistorted signal 103.

In accordance with an example implementation of this disclosure, a system comprises a digital predistortion circuit 102 comprising: a first quantity (e.g., M+P) of delay circuits (e.g., $212_1$-$212_{M+P-1}$) configured to delay a signal to be predistorted (e.g., signal 101); a second quantity (e.g., M+N) of filter tap circuits (e.g., $214_0$-$214_{M+N-1}$), wherein the second quantity is smaller than the first quantity; and a delay-to-filter-taps mapping circuit (e.g., 202) that is operable to map each output of a first subset of the delay circuits (e.g., a subset of N of the P circuits $D_M$-$D_{M+P-1}$) to a corresponding input of the filter tap circuits. The system may comprise circuitry (e.g., 202 controlled by controller 114) operable to select which of the first quantity of delay circuits is in the first subset. The selection of which of the first quantity of delay circuits is in the first subset may be based on a temperature measurement. How many filter tap circuits are in the second quantity of filter tap circuits may be configurable, and filter tap circuits not in the second quantity may be configured into a low-power mode (e.g., the predistortion circuit 102 may comprise ten filter tap circuits 214 and select eight of them to be in the second quantity while gating off the other two so that the unused two use less power). How many filter tap circuits are in the second quantity of filter tap circuits may be determined based on a signal quality metric and a power consumption metric (e.g., eight filter tap circuits 214 may be selected for the second quantity when a high quality signal is more important than power consumption, whereas six filter tap circuits 214 may be selected for the second quantity when it is important to save power, such as in a battery operated mode). The predistortion circuit may comprise cross-term generation circuitry (e.g., 208) operable to generate cross-term signals (e.g., 209) corresponding to the cross products of multiple, differently-delayed versions of a signal input to the digital predistortion circuit (e.g., signal 101). The predistortion circuit may comprise a summer circuit (e.g., 204) operable to sum the outputs of the filter tap circuits and the cross-term signals. Each one of the filter tap circuits may comprise a lookup table configured to: select one of a plurality of possible signal values based on a signal input to the one of the lookup table circuits; and output the selected one of the plurality of possible values. The selection of the one of the plurality of possible values may be based on a temperature measurement. The system may comprise temperature sensor circuitry (e.g., in controller 114) operable to perform the temperature measurement. The plurality of possible values may correspond to a plurality of temperatures at which the digital predistortion circuit was calibrated. The selection of the one of the plurality of possible values may be based on a temperature measurement.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, unless explicitly noted otherwise, the term "based on" means "based at least in part on."

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   a digital predistortion circuit comprising:
      a first quantity of delay circuits configured to delay a signal to be predistorted;
      a second quantity of filter tap circuits, wherein the second quantity is smaller than the first quantity, wherein a number of filter tap circuits in the second quantity of filter tap circuits is configurable, wherein filter tap circuits of the digital predistortion circuit that are not in the second quantity of filter tap circuits are configured into a low-power mode; and
      a delay-to-filter-taps mapping circuit that is operable to map each output of a first subset of the delay circuits to a corresponding input of the filter tap circuits.

2. The system of claim 1, comprising circuitry operable to select which of the first quantity of delay circuits is in the first subset.

3. The system of claim 2, wherein the selection of which of the first quantity of delay circuits is in the first subset is based on a temperature measurement.

4. The system of claim 1, wherein how many filter tap circuits are in the second quantity of filter tap circuits is determined based on a signal quality metric and a power consumption metric.

5. The system of claim 1, wherein the digital predistortion circuit comprises cross-term generation circuitry operable to generate cross-term signals corresponding to cross products of multiple, differently-delayed versions of a signal input to the digital predistortion circuit.

6. The system of claim 5, wherein the digital predistortion circuit comprises a summer circuit operable to sum outputs of the filter tap circuits and the cross-term signals.

7. The system of claim 1, wherein each one of the filter tap circuits comprises a lookup table configured to:
   select one of a plurality of possible values based on a signal input to the one of the filter tap circuits; and
   output the selected one of the plurality of possible values.

8. The system of claim 7, wherein the selection of the one of the plurality of possible values is based on a temperature measurement.

9. The system of claim 7, wherein:
   the plurality of possible values correspond to a plurality of temperatures at which the digital predistortion circuit was calibrated; and
   the selection of the one of the plurality of possible values is based on a temperature measurement.

10. A method comprising:
    in a digital predistortion circuit comprising a first quantity of delay circuits configured to delay a signal to be predistorted, a second quantity of filter tap circuits, wherein the second quantity is smaller than the first quantity, and a delay-to-filter-taps mapping circuit:
    selecting, by the delay-to-filter-taps mapping circuit, a first subset of the delay circuits, wherein the selecting is based on a temperature measurement; and
    coupling each output of the first subset of the delay circuits to a corresponding input of the filter tap circuits.

11. The method of claim 10, wherein the digital predistortion circuit comprises a quantity of filter tap circuits greater than the second quantity and the method comprises determining the second quantity based on a signal quality metric and a power consumption metric.

12. The method of claim 10, wherein the digital predistortion circuit comprises cross-term generation circuitry and the method comprises:

generating, by the cross-term generation circuitry, cross-term signals corresponding to cross products of multiple, differently-delayed versions of a signal input to the digital predistortion circuit.

13. The method of claim 12, wherein the digital predistortion circuit comprises a summer circuit and the method comprises:
   summing, by the summer circuit, the outputs of the filter tap circuits and the cross-term signals.

14. The method of claim 10, wherein the filter tap circuits comprise a plurality of lookup tables and the method comprises:
   selecting, by one of the plurality of lookup tables, one of a plurality of possible values based on a signal input to the one of the lookup tables; and
   outputting, by the lookup table, the selected one of the plurality of possible values.

15. The method of claim 14, wherein the selecting the one of the plurality of possible values is based on a temperature measurement.

16. The method of claim 14, wherein the plurality of possible values correspond to a plurality of temperatures at which the digital predistortion circuit was calibrated.

17. The method of claim 16, wherein the selecting the one of the plurality of possible values is based on a temperature at which the digital predistortion circuit was operating during a time interval prior to the selecting.

* * * * *